United States Patent
Jung et al.

(10) Patent No.: US 12,285,984 B1
(45) Date of Patent: Apr. 29, 2025

(54) APPARATUS FOR ADJUSTING VEHICLE BODY HEIGHT AND GENERATING POWER

(71) Applicants: HYUNDAI MOTOR COMPANY, Seoul (KR); KIA CORPORATION, Seoul (KR)

(72) Inventors: Jeong Chul Jung, Hwaseong-si (KR); Dong Hyun Kim, Hwaseong-si (KR); SuIn Park, Hwaseong-si (KR); Hunkee Kim, Hwaseong-si (KR); Jiseo Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/802,815

(22) Filed: Aug. 13, 2024

(30) Foreign Application Priority Data

Oct. 31, 2023 (KR) .......................... 10-2023-0148208

(51) Int. Cl.
*B60L 50/40* (2019.01)
*B60G 17/015* (2006.01)
*B60G 17/019* (2006.01)

(52) U.S. Cl.
CPC ....... *B60G 17/0157* (2013.01); *B60G 17/019* (2013.01); *B60L 50/40* (2019.02)

(58) Field of Classification Search
CPC .... B60G 17/0157; B60G 17/019; B60L 50/40
See application file for complete search history.

(56) References Cited

U.S. PATENT DOCUMENTS

| | | | | |
|---|---|---|---|---|
| 5,186,486 | A * | 2/1993 | Hynds | B60G 21/0555 74/89.17 |
| 7,377,529 | B2 * | 5/2008 | Green | F16H 19/04 280/124.107 |
| 10,328,762 | B2 * | 6/2019 | Park | F16F 15/022 |
| 2016/0159185 | A1 * | 6/2016 | Kato | B60G 17/06 318/377 |
| 2018/0105007 | A1 * | 4/2018 | Park | B60G 17/0157 |
| 2018/0250998 | A1 * | 9/2018 | Sigmar | B60K 17/358 |
| 2022/0144034 | A1 * | 5/2022 | Kim | H02K 7/102 |

* cited by examiner

*Primary Examiner* — Toan C To
(74) *Attorney, Agent, or Firm* — MCDONNELL BOEHNEN HULBERT & BERGHOFF LLP

(57) ABSTRACT

An apparatus for adjusting a vehicle body height of a vehicle and generating power includes a rack gear connected to a wheel and configured to be moved in a vertical direction by a vertical movement of the wheel relative to a road surface, a pinion gear configured to be rotated by movement of the rack gear while engaging with the rack gear, a one-way bearing connected to the pinion gear and configured to be rotated together with the pinion gear, the one-way bearing being configured to operate to transmit a load when rotating in one direction and not to transmit a load when rotating in the other direction, an electric generator connected to the one-way bearing and configured to generate electricity by the rotation of the one-way bearing in one direction, and a capacitor connected to the electric generator and configured to accumulate electricity generated by the electric generator.

18 Claims, 7 Drawing Sheets

(b)

APPARATUS FOR ADJUSTING VEHICLE BODY HEIGHT AND GENERATING POWER

CROSS REFERENCE TO RELATED APPLICATIONS

This application claims priority to and the benefit of Korean Patent Application No. 10-2023-0148208 filed in the Korean Intellectual Property Office on Oct. 31, 2023, the entire contents of which are incorporated herein by reference.

BACKGROUND

(a) Field

The present disclosure relates to an apparatus for adjusting a vehicle body height and generating power, and more particularly, to a structure of an apparatus for adjusting a height and generating power when a drive module and a space module of a purpose-built vehicle (PBV) are fastened.

(b) Description of the Related Art

Recently, future mobility visions with new concepts for implementing human-oriented dynamic future cities have been introduced in vehicle industries. One of the future mobility solutions is a purpose-built vehicle (PBV) as a purpose-based mobility vehicle.

Examples of the PBV may include an environmentally-friendly movable vehicle based on an electric vehicle (EV). The PBVs may provide various customized services to users while the PBVs move from starting points to destinations in an unmanned or manned autonomous driving manner.

The PBV may include a cab-type drive module equipped with a drive device and capable of autonomously traveling, and a space module coupled to the drive module and configured to be used for cargo, passengers, home office, or the like.

When the drive module and the space module are fastened to each other, the drive module and the space module need to be appropriately adjusted to provide stability. In the related art, an electric or hydraulic pressure actuator is mounted to adjust a ground clearance of a vehicle in accordance with a traveling condition to adjust a fastening height of the vehicle. However, because there is no function of converting a motion of a wheel, which is generated while the vehicle travels, into energy, the above-mentioned effect is limited.

SUMMARY

The present disclosure aims to provide a structure for an apparatus capable of adjusting the height at which a vehicle's drive module and space module are fastened to each other, thereby offering stability, and improving energy efficiency by converting the vertical movement of a wheel into energy.

An embodiment of the present disclosure provides an apparatus for adjusting a vehicle body height of a vehicle and generating power, the apparatus including a rack gear connected to a wheel of the vehicle and configured to be moved in a vertical direction by a vertical movement of the wheel relative to a road surface, a pinion gear configured to be rotated by the movement of the rack gear while engaging with the rack gear, a one-way bearing connected to the pinion gear and configured to be rotated together with the pinion gear by the rotation of the pinion gear, the one-way bearing being configured to operate to transmit a load when rotating in one direction and not to transmit a load when rotating in the other direction, an electric generator connected to the one-way bearing and configured to generate electricity by means of the rotation of the one-way bearing in one direction, and a capacitor connected to the electric generator and configured to accumulate electricity generated by the electric generator.

The vehicle may include a drive module; and a space module configured to be attached to or detached from a rear side of the drive module.

The wheel may be an auxiliary wheel provided in the drive module, and a height at which the drive module and the space module are fastened to each other may be adjusted.

The wheel may be connected to the rack gear and rotatably supported by a connection member at two opposite surfaces of a rotation center portion of the wheel.

The rack gear may be positioned above a support provided on a vehicle body of the vehicle, the connection member may be positioned below the support, and a spring may be interposed between the support and the connection member.

The spring may be wound around a support shaft configured to penetrate the support and connect the rack gear and the connection member.

The pinion gear may be connected to a height fixing part configured to rotate coaxially with the electric generator and the one-way bearing coaxially connected to the pinion gear, and the pinion gear may operate to be connected directly to the electric generator.

The one-way bearing and the height fixing part may be fixed by a locking pin and operate to rotate together.

The pinion gear may operate to be connected directly to the electric generator while engaging with a sliding gear configured to rotate coaxially with the electric generator and move in an axial direction.

The sliding gear may include an electric generator rotation gear provided coaxially with the electric generator, and a coupling part coupled to a pinion gear shaft provided coaxially with the electric generator rotation gear and provided coaxially with the pinion gear by moving in the axial direction.

The one-way bearing may include a first one-way bearing rotation gear disposed at one side and configured to rotate while engaging with a pinion rotation gear provided coaxially with the pinion gear shaft, and a second one-way bearing rotation gear disposed at the other side and configured to rotate while engaging with the electric generator rotation gear.

When the sliding gear moves in the axial direction, the pinion rotation gear and the first one-way bearing rotation gear rotate while engaging with each other, and the electric generator rotation gear and the second one-way bearing rotation gear rotate while engaging with each other, the pinion gear may rotate and operate to generate power.

When the sliding gear moves in the axial direction and the pinion gear shaft and the coupling part are coupled, the pinion rotation gear and the first one-way bearing rotation gear may be uncoupled, and the electric generator rotation gear and the second one-way bearing rotation gear may be uncoupled, such that a rotational force of the electric generator is transmitted to the pinion gear.

A height adjustment groove may be formed in the space module and guide height adjustment when the height adjustment groove is fastened to the drive module.

A height adjustment part may be provided on the support and complete the height adjustment in conjunction with the height adjustment groove.

The height adjustment part may be configured as an optical sensor, the height adjustment groove may be coated with a light absorption material, and whether the height adjustment is completed may be determined on the basis of a distance between the height adjustment part and the height adjustment groove.

The optical sensor may be configured as an infrared sensor or a laser sensor.

The height adjustment part may include a magnetic member configured to slide, and a conductive wire positioned around the magnetic member and configured to allow a current to flow therethrough, a magnet may be disposed in the height adjustment groove, and whether the height adjustment is completed may be determined on the basis of whether the magnetic member and the conductive wire come into contact with each other.

According to the embodiment of the present disclosure, the vertical motion of the wheel, which occurs while the PBV travels on a road, may be converted into electrical energy, and the electrical energy may be used, which may improve energy efficiency.

In addition, the appropriate height adjustment may be implemented when the drive module and the space module of the PBV are fastened to each other, thereby providing stability.

In addition, both the function of adjusting the height of the vehicle body and the function of converting energy may be implemented by a single system, which may simplify complexity of the system, reduce costs, and improve productivity.

DETAILED DESCRIPTION

Figure 1:
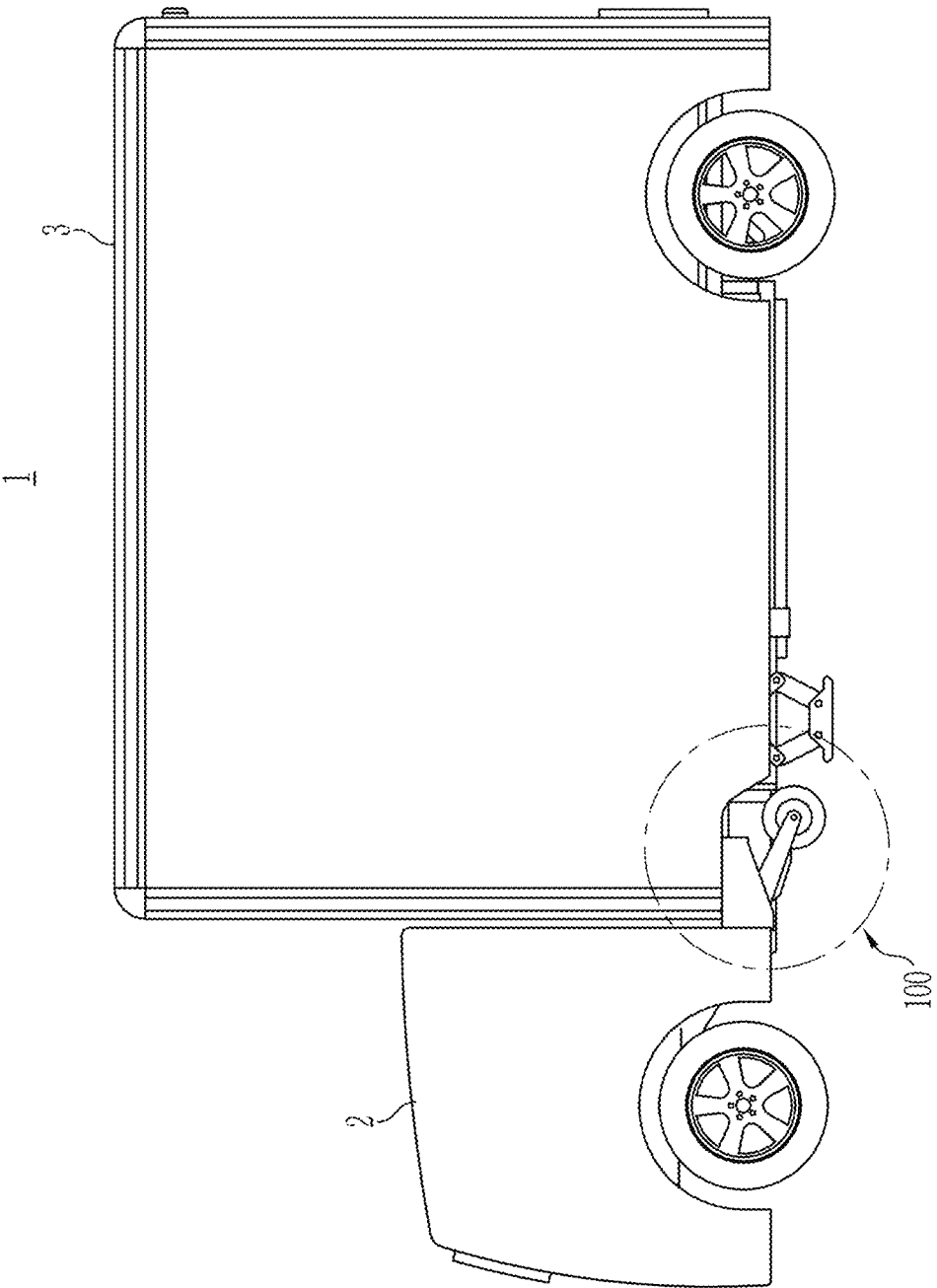
FIG. 1 is a view schematically illustrating a vehicle body coupling structure of a vehicle according to an embodiment of the present disclosure.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

In addition, the constituent elements having the same configurations in several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a structure of an apparatus for adjusting a vehicle body height and generating power according to an embodiment of the present disclosure will be described in detail with reference to the accompanying drawings.

Figure 2:
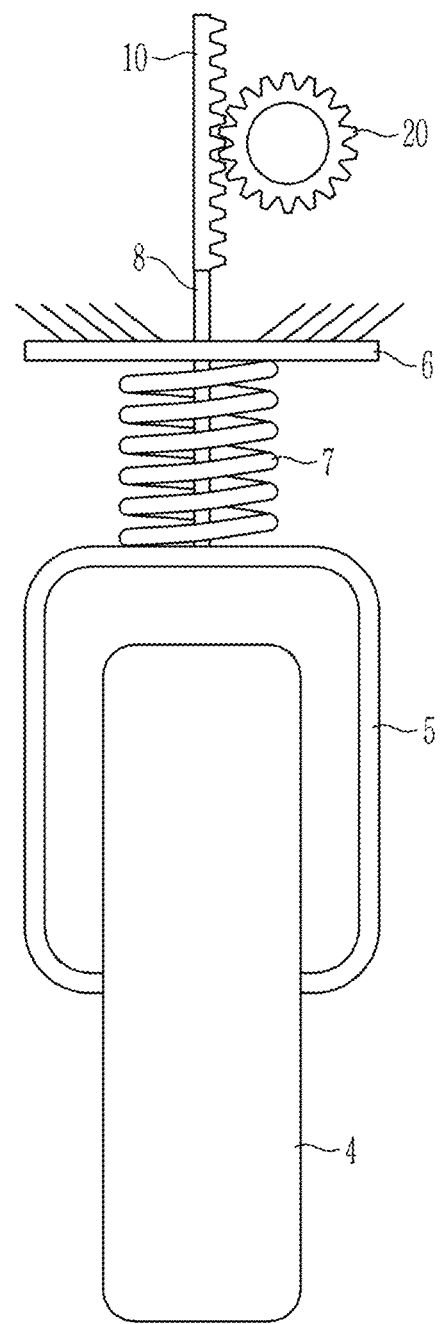
FIG. 2 is a view schematically illustrating a structure for converting a vertical movement of an auxiliary wheel into a rotational force of a pinion gear in an apparatus for adjusting a vehicle body height and generating power according to the embodiment of the present disclosure.
Figure 3:
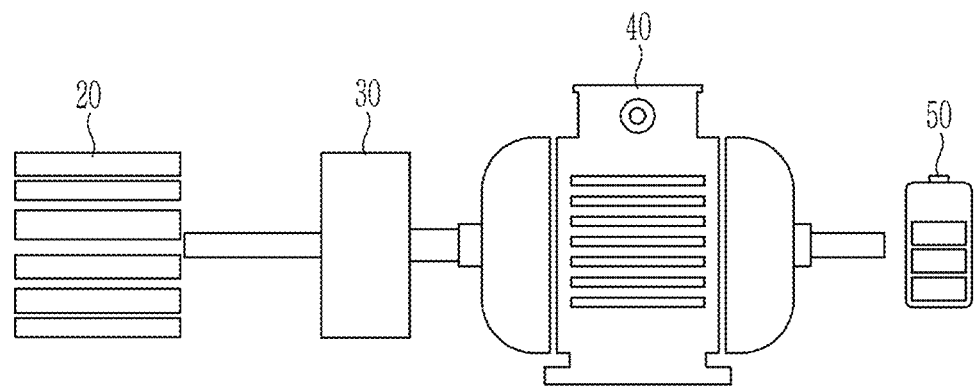
FIG. 3 is a view schematically illustrating a structure for converting a rotational force of the pinion gear into energy in the apparatus for adjusting a vehicle body height and generating power according to the embodiment of the present disclosure.

FIG. 1 is a view schematically illustrating a vehicle body coupling structure of a vehicle according to an embodiment of the present disclosure, FIG. 2 is a view schematically illustrating a structure for converting a vertical movement of an auxiliary wheel into a rotational force of a pinion gear in an apparatus for adjusting a vehicle body height and generating power according to the embodiment of the present disclosure, and FIG. 3 is a view schematically illustrating a structure for converting a rotational force of the pinion gear into energy in the apparatus for adjusting a vehicle body height and generating power according to the embodiment of the present disclosure.

As illustrated in FIG. 1, for example, a vehicle body coupling structure of a vehicle 1 according to an embodiment of the present disclosure may be applied to a purpose-built mobility vehicle (hereinafter, referred to as a 'PBV'). In the present disclosure, an example will be described in which the apparatus is applied to an auxiliary wheel provided in a drive module 2 in the PBV including the drive module 2 and a space module 3 configured to be attached to or detached from a rear side of the drive module 2. However, the present disclosure is not limited thereto. The apparatus may be applied to a general vehicle wheel and used as the apparatus for adjusting a vehicle body height and generating power.

The PBV may be used as a life module vehicle based on an electric vehicle that provides a user with various customized services while the PBV moves from a starting point to a destination.

A vehicle body of the PBV is a vehicle body suitable for small-quantity production of various types of vehicles having a small number of components. The vehicle body of the PBV may be manufactured to have various shapes and sizes.

In the embodiment of the present disclosure, the vehicle 1 may include the cab-type drive module 2, and the box-type space module 3 configured to be coupled to the rear side of the drive module 2.

An apparatus 100 for adjusting a vehicle body height and generating power according to the embodiment of the present disclosure may be provided at a rear side of a lower end of the drive module 2.

The apparatus 100 for adjusting a vehicle body height and generating power according to the embodiment of the present disclosure may include auxiliary wheels 4 configured to assist main wheels respectively provided in the drive module 2 and the space module 3. The auxiliary wheel 4 may rotate together with the main wheel while being in contact with a road surface when the vehicle 1 moves.

With reference to FIGS. 2 and 3, the apparatus 100 for adjusting a vehicle body height and generating power includes a rack gear 10, a pinion gear 20, a one-way bearing 30, an electric generator 40, and a capacitor 50.

The rack gear 10 has a structure in which teeth having the same size and shape are machined at equal intervals on a flat surface of a straight, quadrangular or circular rod. The rack gear 10 is used together with the pinion gear 20 and serves to convert a rotational motion into a rectilinear motion or convert a rectilinear motion into a rotational motion. In the embodiment of the present disclosure, the rack gear 10 is connected to the auxiliary wheel 4 provided in the drive module 2. When the auxiliary wheel 4 comes into contact with the road surface and rotates, the rack gear 10 may be reciprocated in a vertical direction by a vertical movement of the auxiliary wheel 4 relative to the road surface.

The pinion gear 20 may be disposed to engage with the rack gear 10 and rotated by the vertical movement of the rack gear 10 relative to the road surface. The pinion gear 20 may convert a rectilinear motion of the rack gear 10 into a rotational motion.

As illustrated in FIG. 3, the one-way bearing 30 is coaxially connected to the pinion gear 20 and rotated by the rotation of the pinion gear 20. The one-way bearing 30 operates to transmit a load when rotating in one direction and not to transmit a load when rotating in the other direction. That is, the one-way bearing 30 transmits power when rotating in one direction and does not transmit power when rotating and idling in a direction opposite to one direction.

For example, the one-way bearing 30 may include an outer casing, a handle shaft, and a plurality of rollers positioned between the outer casing and the handle shaft and use the principle that the plurality of rollers is fixed when the outer casing or the handle shaft rotates in one direction, such that a load is applied, and power is transmitted.

The electric generator 40 is coaxially connected to the one-way bearing 30 and generates electricity when the one-way bearing 30 rotates in one direction, i.e., the direction in which the one-way bearing 30 transmits power. The electric generator 40 may be a drive motor.

The electricity generated by the electric generator 40 accumulates on the capacitor 50 connected to the electric generator 40.

As illustrated in FIG. 2, the auxiliary wheel 4 may be rotatably supported by a connection member 5 at two opposite surfaces of a rotation center portion of the auxiliary wheel 4.

The auxiliary wheel 4 and the connection member 5 are positioned below a support 6 provided at a side of the drive module 2 of the vehicle 1. A spring 7 may be interposed between a lower portion of the support 6 and an upper portion of the connection member 5.

The upper portion of the connection member 5 and the rack gear 10 are connected to a support shaft 8, and the support shaft 8 penetrates the support 6.

The spring 7 is wound around the support shaft 8. When the auxiliary wheel 4 comes into contact with the road surface and moves, the spring 7 may mitigate an impact and maintain a predetermined interval between the support 6 and the connection member 5.

The rack gear 10 connected to the support shaft 8, the pinion gear 20 connected to the rack gear 10, the electric generator 40, and the capacitor 50 may be positioned above the support 6.

Figure 4:
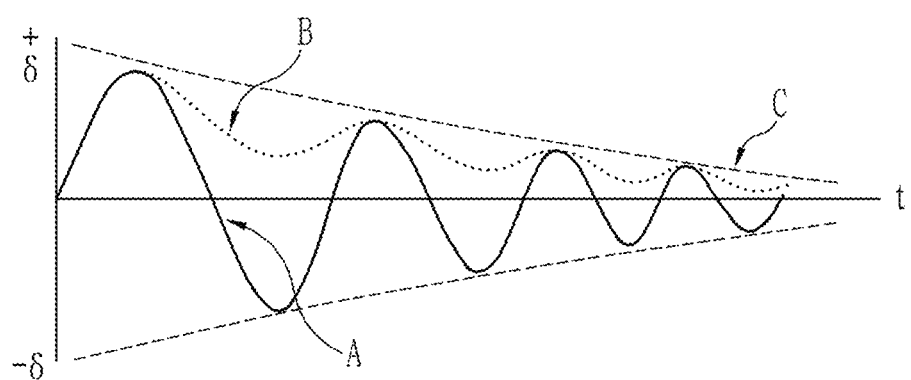
FIG. 4 is a graph illustrating a displacement of the auxiliary wheel and a displacement of input energy of an electric generator over time in the apparatus for adjusting a vehicle body height and generating power according to the embodiment of the present disclosure.

FIG. 4 is a graph illustrating a displacement of the auxiliary wheel and a displacement of input energy of the electric generator over time in the apparatus for adjusting a vehicle body height and generating power according to the embodiment of the present disclosure.

With reference to FIG. 4, when the vehicle 1 moves, a vertical displacement A of the auxiliary wheel 4 occurs in a Z-axis direction, and the displacement 6 is gradually decreased by the spring 7 over time (t) (C).

The spring 7 having no damping force applies a force for returning the Z-axis displacement of the auxiliary wheel 4 to an original position made by an external force, and this force induces a vertical translational motion of the auxiliary wheel 4. The translational motion of the auxiliary wheel 4 is transmitted to the rack gear 10 and the pinion gear 20, and a unidirectional rotational force B is transmitted to the electric generator 40 through the one-way bearing 30.

Because of the power generation, the vertical displacement A of the auxiliary wheel 4 gradually decreases (C).

Figure 5A:
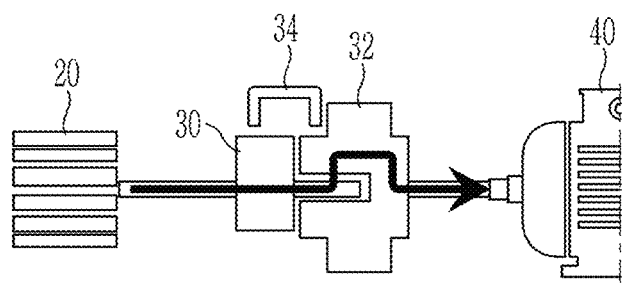
FIGS. 5A and 5B are views illustrating an example of a connection structure between the pinion gear and the electric generator for adjusting a vehicle body height and generating power in the apparatus for adjusting a vehicle body height and generating power according to the embodiment of the present disclosure.
Figure 5B:
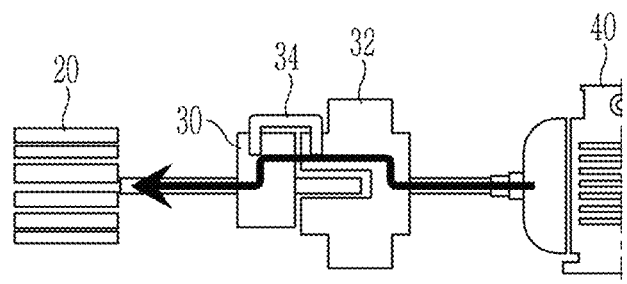

FIGS. 5A and 5B are views illustrating an example of a connection structure between the pinion gear and the electric generator for adjusting a vehicle body height and generating power in the apparatus for adjusting a vehicle body height and generating power according to the embodiment of the present disclosure.

With reference to FIGS. 5A and 5B, the pinion gear 20 may operate to be connected directly to the electric generator 40 to adjust a height of the vehicle body and generate power. To this end, a height fixing part 32 may be provided between the electric generator 40 and the one-way bearing 30 coaxially connected to the pinion gear 20.

The pinion gear 20 and the one-way bearing 30 may be provided at a side of the drive module 2, and the height fixing part 32 and the electric generator 40 may be provided at a side of the space module 3.

When the drive module 2 and the space module 3 are coupled, a shaft of the one-way bearing 30 is inserted into a shaft groove of the height fixing part 32, such that a coupling height between the modules 2 and 3 may be controlled. In the state in which the one-way bearing 30 is inserted into the shaft groove of the height fixing part 32, the shaft of the one-way bearing 30 is connected to a shaft of the electric generator 40 and transmits the unidirectional rotational force of the one-way bearing 30 to the electric generator 40 by means of the rotation of the pinion gear 20, thereby producing electricity.

The one-way bearing 30 and the height fixing part 32 may be fixed by the locking pin 34. In this case, when the electric generator 40 (drive motor) rotates by using electricity, the height fixing part 32 and the one-way bearing 30 may rotate together, which may rotate the pinion gear 20.

The rotation of the pinion gear 20 moves the rack gear 10 vertically. As the rack gear 10 moves vertically, the auxiliary wheel 4 moves vertically, such that a height between the modules 2 and 3 may be adjusted. As illustrated in FIGS. 5A and 5B, the vehicle body height may be adjusted in two directions of the modules 2 and 3 depending on whether the locking pin 34 is fastened.

Figure 6A:
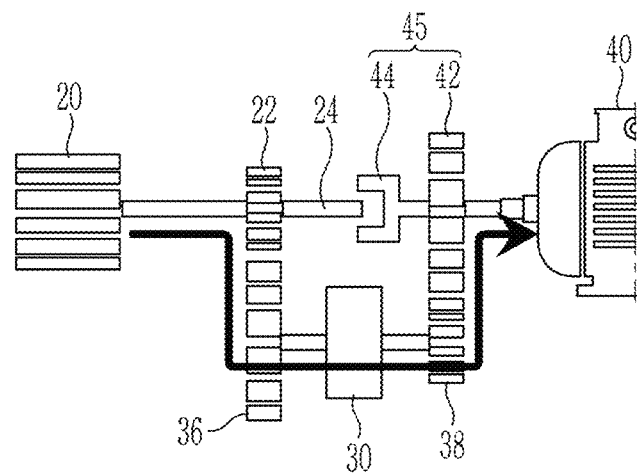
FIGS. 6A and 6B are views illustrating another example of the connection structure between the pinion gear and the electric generator for adjusting a vehicle body height and generating power in the apparatus for adjusting a vehicle body height and generating power according to the embodiment of the present disclosure.
Figure 6B:
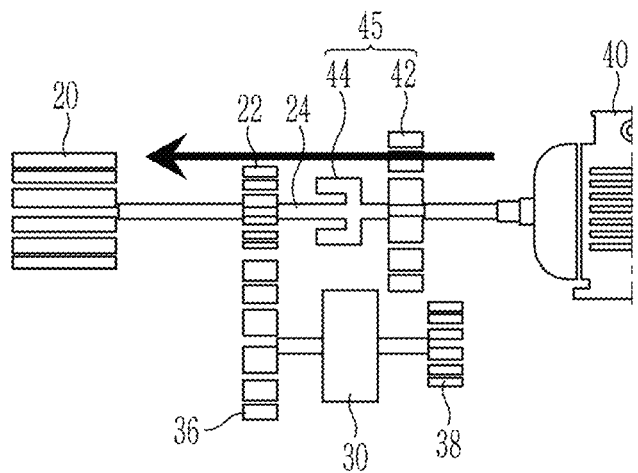

FIGS. 6A and 6B are views illustrating another example of the connection structure between the pinion gear and the electric generator for adjusting a vehicle body height and generating power in the apparatus for adjusting a vehicle body height and generating power according to the embodiment of the present disclosure.

With reference to FIGS. 6A and 6B, the pinion gear 20 may operate to be connected directly to the electric generator 40 to adjust a height of the vehicle body and generate power. To this end, a sliding gear 45 may be provided between the pinion gear 20 and the electric generator 40.

The pinion gear 20 and the one-way bearing 30 may be provided at the side of the drive module 2, and the sliding gear 45 and the electric generator 40 may be provided at the side of the space module 3.

The sliding gear 45 may include an electric generator rotation gear 42 provided coaxially with the electric generator 40, and a coupling part 44. The coupling part 44 may be provided coaxially with the electric generator rotation gear 42 and coupled to a pinion gear shaft 24, which is provided coaxially with the pinion gear 20, while moving in an axial direction.

In this case, the one-way bearing 30 may include a first one-way bearing rotation gear 36 disposed at one side and configured to rotate while engaging with a pinion rotation gear 22 provided coaxially with the pinion gear shaft 24, and a second one-way bearing rotation gear 38 disposed at the other side and configured to rotate while engaging with the electric generator rotation gear 42.

When the drive module 2 and the space module 3 are coupled, the sliding gear 45 moves in the axial direction toward the pinion gear 20, and the pinion gear shaft 24 is inserted into the coupling part 44, such that the coupling height between the modules 2 and 3 may be controlled.

In addition, the pinion rotation gear 22 and the first one-way bearing rotation gear 36 rotate while engaging with each other, and the electric generator rotation gear 42 and the second one-way bearing rotation gear 38 rotate while engaging with each other, such that the rotation of the pinion gear 20 transmits the unidirectional rotational force of the one-way bearing 30 to the electric generator 40, thereby producing electricity.

When the sliding gear 45 further moves in the axial direction toward the pinion gear 20, the pinion gear shaft 24 and the coupling part 44 are coupled and fixed, the pinion rotation gear 22 and the first one-way bearing rotation gear 36 are uncoupled, and the electric generator rotation gear 42 and the second one-way bearing rotation gear 38 are uncoupled. In this case, when the electric generator 40 rotates by using electricity, the sliding gear 45 and the pinion gear 20 rotate, and the rotation of the pinion gear 20 moves the rack gear 10 vertically. As the rack gear 10 moves vertically, the auxiliary wheel 4 moves vertically, such that the height between the modules 2 and 3 may be adjusted.

As illustrated in FIGS. 6A and 6B, as the sliding gear 45 moves, the vehicle body height may be adjusted in two directions of the modules 2 and 3.

Figure 7:
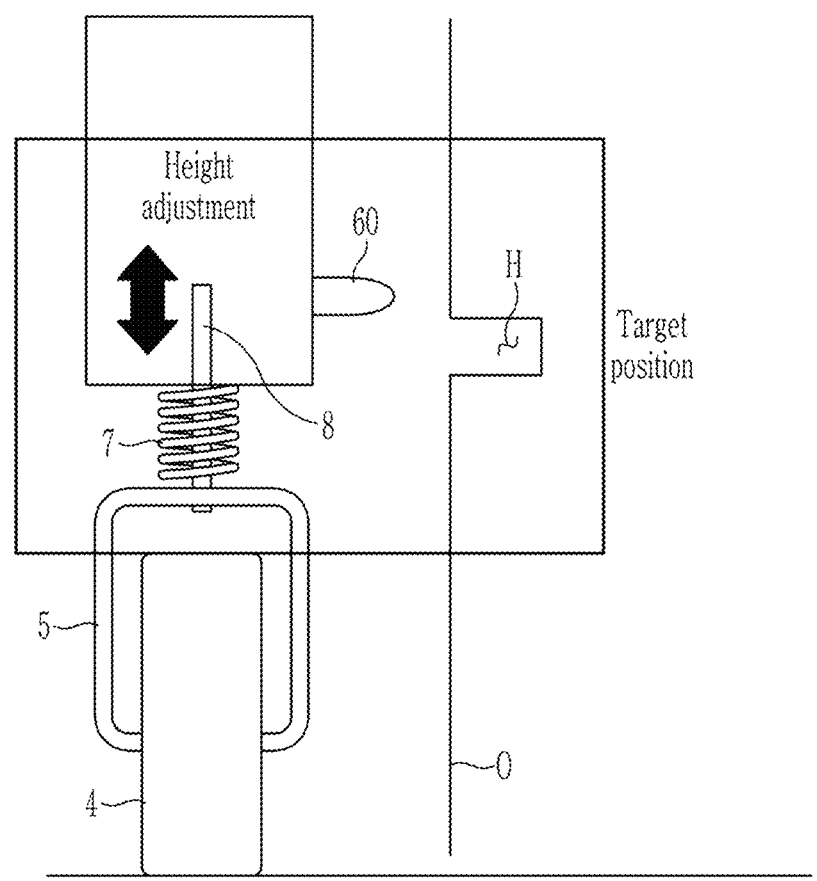
FIG. 7 is a view schematically illustrating a structure for determining the completion of the adjustment of the vehicle body height in the apparatus for adjusting a vehicle body height and generating power according to the embodiment of the present disclosure.
Figure 8:
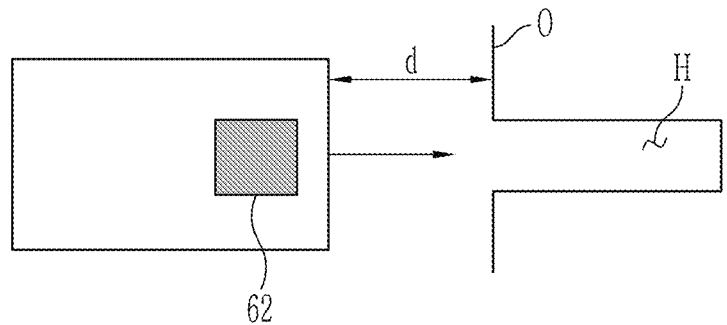
FIG. 8 is a view illustrating an example of the structure for determining the completion of the adjustment of the vehicle body height in the apparatus for adjusting a vehicle body height and generating power according to the embodiment of the present disclosure.
Figure 9:
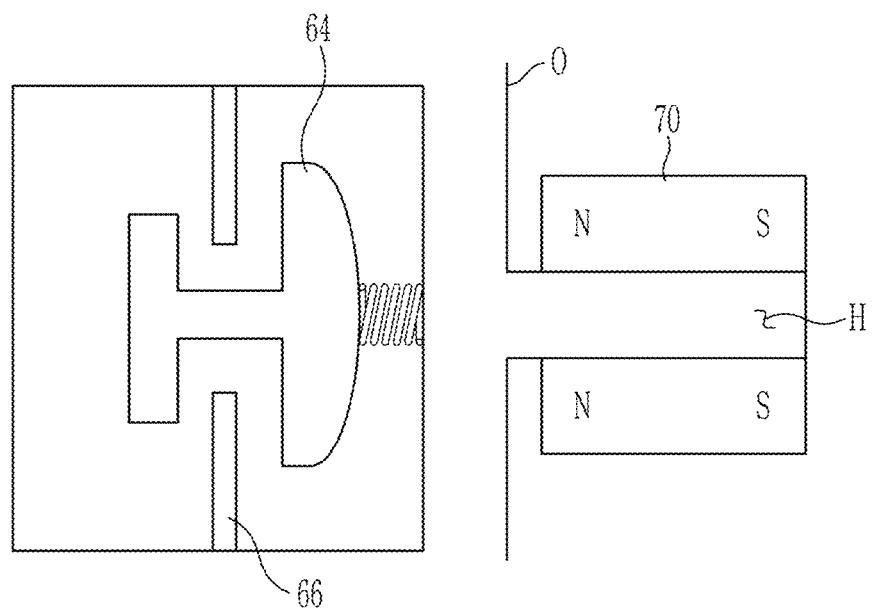
FIG. 9 is a view illustrating another example of the structure for determining the completion of the adjustment of the vehicle body height in the apparatus for adjusting a vehicle body height and generating power according to the embodiment of the present disclosure.

FIG. 7 is a view schematically illustrating a structure for determining the completion of the adjustment of the vehicle body height in the apparatus for adjusting a vehicle body height and generating power according to the embodiment of the present disclosure, FIG. 8 is a view illustrating an example of the structure for determining the completion of the adjustment of the vehicle body height in the apparatus for adjusting a vehicle body height and generating power according to the embodiment of the present disclosure, and FIG. 9 is a view illustrating another example of the structure for determining the completion of the adjustment of the vehicle body height in the apparatus for adjusting a vehicle body height and generating power according to the embodiment of the present disclosure.

With reference to FIG. 7, a height adjustment groove H may be formed in the space module 3 and guide the height adjustment when being fastened to the drive module 2, and a height adjustment part 60 may be provided on the support 6 of the drive module 2 and complete the height adjustment in conjunction with the height adjustment groove H.

The height adjustment part 60 may have a height adjustment pin protruding toward the height adjustment groove H. As the height adjustment pin is inserted into the height adjustment groove H, the height between the modules 2 and 3 may be adjusted.

In addition, as illustrated in FIG. 8, the height adjustment part 60 may be configured as an optical sensor 62, and the height adjustment groove H may be coated with a light absorption material. In this case, the optical sensor 62 may be configured as an infrared sensor or a laser sensor.

The optical sensor 62 may emit infrared rays or laser beams toward the height adjustment groove H, and whether the adjustment of the height between the modules 2 and 3 is completed may be determined on the basis of a distance d between the height adjustment part 60 and the height adjustment groove H that is measured by the infrared rays or the laser beams.

In addition, as illustrated in FIG. 9, the height adjustment part 60 may include a magnetic member 64 configured to slide, and conductive wires 66 positioned around the magnetic member 64 and configured to allow a current to flow therethrough. In addition, a magnet 70 may be disposed in the height adjustment groove H.

In case that the drive module 2 and the space module 3 are not coupled at an appropriate height, the magnet 70 does not come into contact with the conductive wires 66. The magnet 70 may be positioned to be spaced apart from the conductive wires 66 at a predetermined interval by the spring.

When the magnetic member 64 approaches the magnet 70 in case that the drive module 2 and the space module 3 are coupled at an appropriate height, the magnetic member 64 is slid toward the space module 3 by a magnetic force and comes into contact with the conductive wires 66. The conductive wires 66 are connected to each other with the magnetic member 64 interposed therebetween, such that the current flows through the conductive wires 66. Therefore, the completion of the height adjustment is determined.

As described above, according to the embodiment of the present disclosure, the vertical motion of the wheel, which occurs while the PBV travels on a road, may be converted into electrical energy, and the electrical energy may be used, which may improve energy efficiency.

In addition, the appropriate height adjustment may be implemented when the drive module and the space module of the PBV are fastened to each other, thereby providing stability.

In addition, both the function of adjusting the height of the vehicle body and the function of converting energy may be implemented by a single system, which may simplify complexity of the system, reduce costs, and improve productivity.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

The invention claimed is:

1. An apparatus for adjusting a vehicle body height of a vehicle and generating power, the apparatus comprising:
   a rack gear connected to a wheel of the vehicle and configured to be moved in a vertical direction by a vertical movement of the wheel relative to a road surface;
   a pinion gear configured to be rotated by movement of the rack gear while engaging with the rack gear;
   a one-way bearing connected to the pinion gear and configured to be rotated together with the pinion gear by the rotation of the pinion gear, the one-way bearing being configured to operate to transmit a load when rotating in one direction and not to transmit a load when rotating in an other direction;
   an electric generator connected to the one-way bearing and configured to generate electricity by the rotation of the one-way bearing in one direction; and
   a capacitor connected to the electric generator and configured to accumulate electricity generated by the electric generator.

2. The apparatus of claim 1, wherein the vehicle comprises a drive module and a space module configured to be attached to or detached from a rear side of the drive module.

3. The apparatus of claim 2, wherein the wheel is an auxiliary wheel provided in the drive module, and a height at which the drive module and the space module are fastened to each other is adjusted.

4. The apparatus of claim 1, wherein the wheel is connected to the rack gear and rotatably supported by a connection member at two opposite surfaces of a rotation center portion of the wheel.

5. The apparatus of claim 4, wherein:
   the rack gear is positioned above a support provided on a vehicle body of the vehicle;
   the connection member is positioned below the support; and
   a spring is interposed between the support and the connection member.

6. The apparatus of claim 5, wherein the spring is wound around a support shaft configured to penetrate the support and to connect the rack gear and the connection member.

7. The apparatus of claim 1, wherein the pinion gear is connected to a height fixing part configured to rotate coaxially with the electric generator and the one-way bearing coaxially connected to the pinion gear, and the pinion gear is connected directly to the electric generator.

8. The apparatus of claim 7, wherein the one-way bearing and the height fixing part are fixed by a locking pin and are configured to rotate together.

9. The apparatus of claim 1, wherein:
   the pinion is connected directly to the electric generator while engaging with a sliding gear configured to rotate coaxially with the electric generator and move in an axial direction.

10. The apparatus of claim 9, wherein the sliding gear comprises:
    an electric generator rotation gear provided coaxially with the electric generator; and
    a coupling part coupled to a pinion gear shaft provided coaxially with the electric generator rotation gear and provided coaxially with the pinion gear by moving in the axial direction.

11. The apparatus of claim 10, wherein the one-way bearing comprises:
    a first one-way bearing rotation gear disposed at one side and configured to rotate while engaging with a pinion rotation gear provided coaxially with the pinion gear shaft; and
    a second one-way bearing rotation gear disposed at an other side and configured to rotate while engaging with the electric generator rotation gear.

12. The apparatus of claim 11, wherein when the sliding gear moves in the axial direction, the pinion rotation gear and the first one-way bearing rotation gear rotate while engaging with each other, and the electric generator rotation gear and the second one-way bearing rotation gear rotate while engaging with each other, the pinion gear rotates and operates to generate power.

13. The apparatus of claim 11, wherein when the sliding gear moves in the axial direction and the pinion gear shaft and the coupling part are coupled, the pinion rotation gear and the first one-way bearing rotation gear are uncoupled, and the electric generator rotation gear and the second one-way bearing rotation gear are uncoupled, such that a rotational force of the electric generator is transmitted to the pinion gear.

14. The apparatus of claim 3, wherein a height adjustment groove is formed in the space module and is configured to guide height adjustment when the height adjustment groove is fastened to the drive module.

15. The apparatus of claim 14, wherein:
    a height adjustment part is provided on a support and is configured to complete the height adjustment in conjunction with the height adjustment groove.

16. The apparatus of claim 15, wherein:
    the height adjustment part is configured as an optical sensor;
    the height adjustment groove is coated with a light absorption material; and
    whether the height adjustment is completed is determined based on a distance between the height adjustment part and the height adjustment groove.

17. The apparatus of claim 16, wherein the optical sensor is configured as an infrared sensor or a laser sensor.

18. The apparatus of claim 15, wherein the height adjustment part comprises:
   a magnetic member configured to slide; and
   a conductive wire positioned around the magnetic member and configured to allow a current to flow therethrough;
   wherein a magnet is disposed in the height adjustment groove; and
   whether the height adjustment is completed is determined based on whether the magnetic member and the conductive wire come into contact with each other.

\* \* \* \* \*